UNITED STATES PATENT OFFICE.

CARL BOSCH AND WILHELM WILD, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF BADEN.

PROCESS OF PRODUCING HYDROGEN.

1,157,669.     Specification of Letters Patent.     Patented Oct. 26, 1915.

No Drawing.     Application filed April 19, 1913. Serial No. 762,345.

*To all whom it may concern:*

Be it known that we, CARL BOSCH and WILHELM WILD, citizens of the German Empire, residing at Ludwigshafen-on-the-Rhine, Germany, have invented new and useful Improvements in the Process of Producing Hydrogen, of which the following is a specification.

It is known that carbon monoxid can be mixed with water vapor and the mixture passed over a catalytic agent at a raised temperature with the result that the carbon monoxid is oxidized at the expense of the steam, so that carbon dioxid and hydrogen result, as illustrated by the equation $$CO + H_2O = CO_2 + H_2.$$

We have now found that if the aforesaid reaction be carried out under a pressure increased over that of the atmosphere the following advantages are obtained: The velocity of the reaction is considerably accelerated, so that, with the same velocity of the gases, the reaction proceeds farther and less unchanged carbon monoxid leaves the reaction vessel and smaller apparatus can be employed and less heat be lost, while the regeneration of heat takes place more effectively when the gases are under increased pressure, and in many cases the heat of reaction is sufficient to maintain the temperature necessary for the reaction. The process of this reaction can be carried out either with pure carbon monoxid or with carbon monoxid which is more or less diluted with other gases, such for instance as water gas, generator gas and the like. The reaction is of particular advantage when gases are treated which contain comparatively little carbon monoxid and which, during the reaction, evolve but little heat, so that, if desired, water gas can be first treated in any suitable manner to remove the greater part of the carbon monoxid, and the residual gases be then treated according to this invention in order to remove the remaining part. The carbon dioxid which is formed during the passage of the carbon monoxid and steam over the catalytic agent can be removed in any suitable manner, for instance by absorption by water or suitable alkaline matter, and, if desired, the residual gases with steam can be passed again once or more than once over the catalytic agent to remove further quantities of carbon monoxid. In this latter case, it is advisable to carry out the absorption of the carbon dioxid also under increased pressure, so that repeated compression is not necessary. The absorption of the carbon dioxid by means of water is especially suitable when working under increased pressure.

Suitable pressures for carrying out the reaction according to this invention are, for example, from about 4 to 40 atmospheres, although higher pressures can be employed without departing from the nature of our invention.

The process according to this invention is very useful in combination with the catalytic production of ammonia under pressure, because the hydrogen which has been obtained according to our invention can be immediately employed for the production of the ammonia, without the pressure being released.

Now what I claim is:—

1. The process of producing hydrogen by causing carbon monoxid and steam to react under a pressure increased over that of the atmosphere in the presence of a hot catalytic agent.

2. The process of producing hydrogen by causing water gas and steam to react under a pressure increased over that of the atmosphere in the presence of a hot catalytic agent.

3. The process of producing hydrogen by removing the greater part of the carbon monoxid from a mixture containing hydrogen and carbon monoxid, and then passing the residual gases in admixture with steam and under a pressure increased over that of the atmosphere over a hot catalytic agent.

In testimony whereof we have hereunto set our hands in the presence of two subscribing witnesses.

CARL BOSCH.
                         WILHELM WILD.

Witnesses:
    J. ALEC. LLOYD,
    JOSEPH PFEIFFER.